United States Patent [19]

Avaneas

[11] Patent Number: 5,359,714
[45] Date of Patent: Oct. 25, 1994

[54] AVAN COMPUTER BACKPLANE-A REDUNDANT, UNIDIRECTIONAL BUS ARCHITECTURE

[76] Inventor: Nicolas Avaneas, 5 Lyn Oak La., Kings Park, N.Y. 11754

[21] Appl. No.: 816,294

[22] Filed: Jan. 6, 1992

[51] Int. Cl.$^5$ .................. G06F 13/00; G06F 13/38; G06F 13/40
[52] U.S. Cl. .................. 395/275; 395/325; 364/240; 364/240.1; 364/DIG. 1
[58] Field of Search .............. 395/275, 325; 361/380, 361/413, 424

[56] References Cited

U.S. PATENT DOCUMENTS

| | | | |
|---|---|---|---|
| 3,800,097 | 3/1974 | Maruscak et al. | 361/413 |
| 4,575,780 | 3/1986 | Brombal et al. | 361/413 |
| 4,658,333 | 4/1987 | Grimes | 361/413 |
| 4,697,858 | 10/1987 | Balakrishnan | 307/475 |
| 4,777,615 | 10/1988 | Potash | 395/800 |
| 5,113,496 | 5/1992 | McCalley et al. | 395/200 |
| 5,113,523 | 5/1992 | Colley et al. | 395/800 |
| 5,119,273 | 6/1992 | Corda | 361/413 |

Primary Examiner—Dale M. Shaw
Assistant Examiner—D. Dinh

[57] ABSTRACT

A computer backplane data path which connects computer backplane modules in a backplane structure. A T-ring made up of T-sections form a ring-like topology, wherein one T-section initiates from each computer backplane module and passively connects other computer backplane modules. At the end of the backplane structure each T-section folds back to continue connecting previously unconnected modules in a continuous loop process, until all modules have been connected with the desired number of T-sections. A plurality of A-paths, one per computer backplane module, so that each connecting T-section of the T-ring forms an active-passive, unidirectional data ring.

9 Claims, 11 Drawing Sheets

AVAN COMPUTER BACKPLANE-A REDUNDANT, UNIDIRECTIONAL BUS ARCHITECTURE

BACKGROUND OF THE INVENTION

The present invention relates, in general, to data processing systems, and more particularly to high performance computer backplanes.

The rapidly increasing data processing speed and the application of advanced parallel computer distributed processing architectures have introduced requirements for larger computer backplanes, larger volume data transfers, and much faster data rates.

Modern computer backplanes require hundreds of interconnections to implement the multi-bit address, data and control shared among the Application System Modules, also called ASMs, in large and complex systems. Higher volume data transfers introduce a bottleneck in the operation of the modern high speed multi-processor systems due to data and address sharing by several processors. Additionally, higher data rates set a limit on the size of the backplanes due to the fast degradation of data from multiple loading and increased capacitance in long signal paths.

There is a need for a backplane which will to reduce the complexity and the number of interconnecting paths of the multi-module and multi-pin modern computer backplanes, as well as of the backplanes of other complex computerized systems. This backplane should reduce the Application System data transfer timing and increase its data throughput. Additionally, the backplane should provide a single fault tolerance data transfer over the computer backplane without involvement of the Application System. There should be no restriction in the number of Application System Modules hosted by the computer backplane while the Application System maintains an extremely low bit error rate (BER) and a very high data transfer rate. The solution should also simplify the data transfer process among the Application System Modules and reduction of their communication overhead by having the computer backplane undertaking this responsibility for every Application System it hosts. Ideally the new backplane should achieve these goals during communication among Application System Modules which reside in different computer backplanes of either the same or separate cabinets.

DETAILED DESCRIPTION

An AVAN backplane is a combination of a special passive backplane topology, called T-ring topology, and a set of active electronic circuits forming active signal paths, called A-paths, installed in a module, called AVAN module. The AVAN module, at a minimum, contains one or more A-paths and may also contain a connector to accept an ASM and a connector for its insertion in the AVAN backplane motherboard. The AVAN module may also contain additional electronic components implementing the AVAN backplane data transfer protocol, and the interface with the ASM.

The preferred AVAN backplane implementation is achieved when the AVAN module components including the A-path components are installed in a discrete module inserted and locked in a connector of the AVAN backplane motherboard. Alternatively, these components may be installed on the printed circuit motherboard of the AVAN backplane, or in the ASMs. The latter embodiment is the least desired, because this embodiment removes the generic and the independent operation of the AVAN backplane.

Each ASM interfaces to the AVAN backplane through an AVAN module. When an ASM is inserted in the AVAN backplane it is actually inserted in a connector of an AVAN module, through which it communicates to other ASMs. The AVAN module undertakes the responsibility to transfer, receive and verify the data of its ASM to and from the other ASMs through their corresponding AVAN modules. Therefore, the AVAN backplane becomes a three dimensional rather than a two dimensional conventional backplane.

Figure 1:
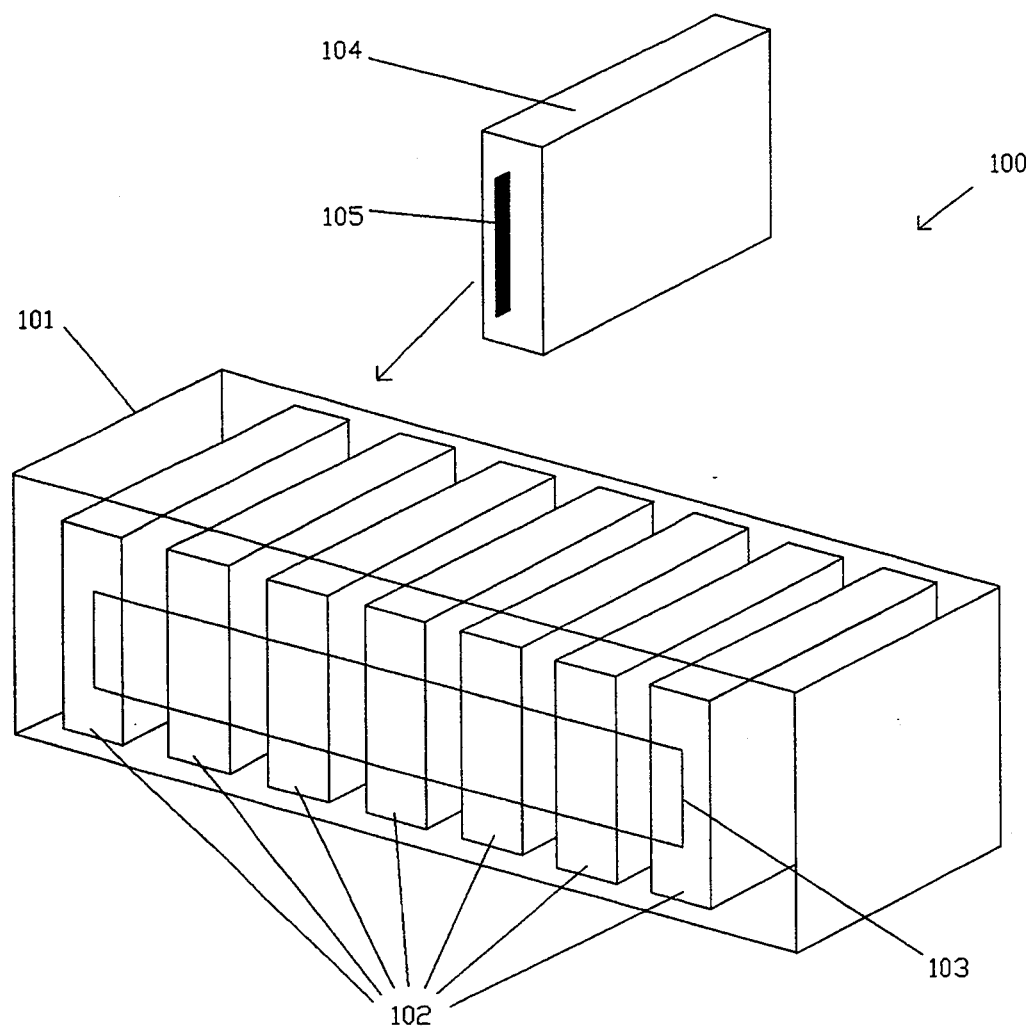
FIG. 1 illustrates the 3 dimensional implementation of the AVAN backplane.

FIG. 1 shows a three dimensional AVAN backplane 100 comprising an AVAN backplane motherboard 101, AVAN modules 102, and AVAN ring buses 103, which are defined below. The illustration also shows an ASM 104, which is inserted into the AVAN backplane through a connector 105 of an AVAN module.

The AVAN passive backplane T-ring topology comprises a number of loop-like signal paths, called the T-rings. The T-rings replace all or the majority of the conventional backplane linear signal paths. A T-ring comprises M (M=1,2,3,...) non connected and overlapping signal path sections, called T-sections, where M represents the maximum number of the ASMs serviced by the T-ring. A T-ring starts from any backplane module with a T-section that connects this module with j-1 (j=2,3,..., where j<=M) other modules. Lets, hereafter, generally name the AVAN module representing any one of the M AVAN modules connected by a T-ring as the Kth AVAN module, where K=1,2,3,...M. Then the Kth−1 and Kth+1 AVAN modules are the previous and the next or the Kth AVAN modules in the T-ring sequence, not in the physical sequence of their position in the backplane.

Figure 2:
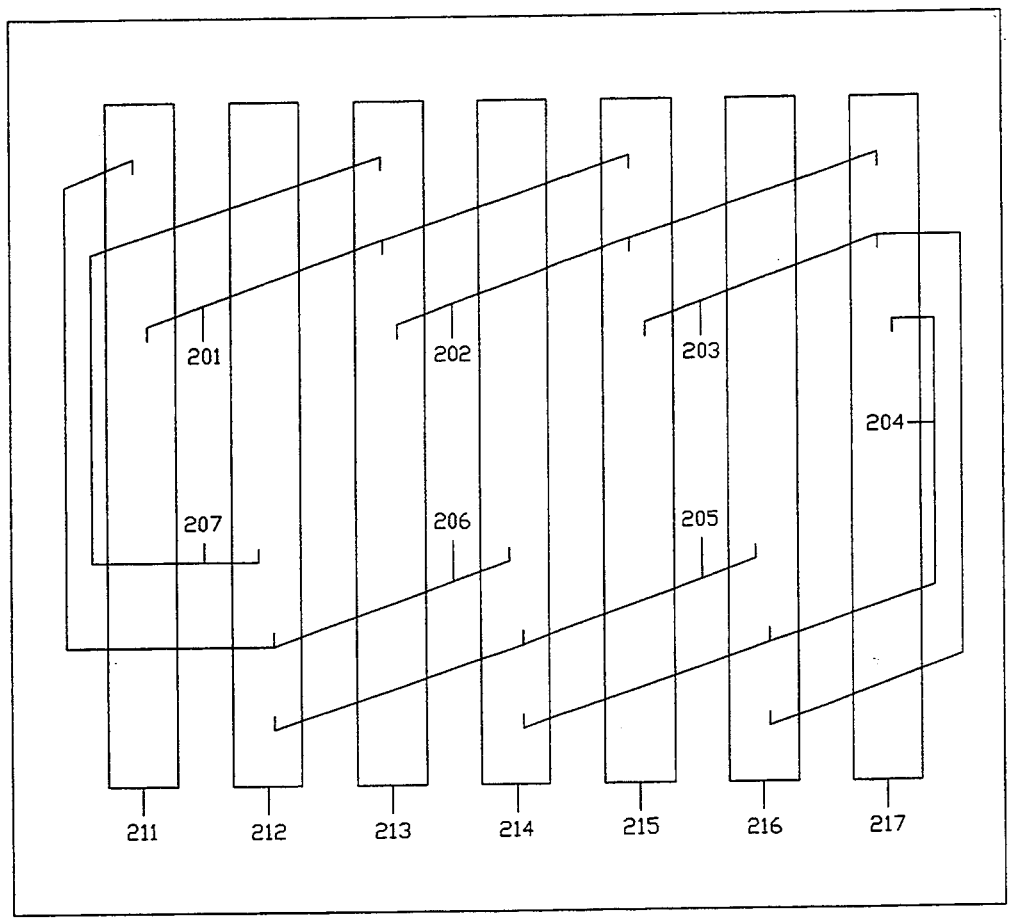
FIG. 2 illustrates the T-ring topology of the AVAN computer backplane.

FIG. 2 illustrates an AVAN backplane T-ring topology with seven modules (M=7) and T-sections each connecting three modules (j=3). The T-ring can start at any backplane for example module 211 with a T-section 201 that connects this module with two (j-1=2) other modules 213 and 215. The next T-section 202 starts from the next module 213 in the T-ring sequence, the Kth+1 module, and connects the last two modules 213 and 215 connected by the previous T-section 201, plus one new module 217 since j=3. The same process of connection is repeated for the next T-section and all the other T-sections of the T-ring. A T-section does not necessarily connect physically adjacent modules. Actually the best topology is obtained when a T-section connects every other module 211,213,215. When a T-section 203 reaches either end of the AVAN backplane it folds back and continues connecting the AVAN modules left previously unconnected 215,217,216. This process is repeated until all seven T-sections of a T-ring are connected to three modules. Furthermore, this topology connects each module with three (j=3) T-sections. A T-section signal path can be realized by a wire, a printed circuit path, a fiber optics wire, a coaxial wire, or a microwave pipeline.

An A-path comprises active and passive electronic components forming an active data bit-wide signal path. The A-path connects the T-sections of an AVAN module, thus forming with the T-sections a continuous active-passive data ring path. At its minimum realization each A-path comprises a set of j-1 electrical or optical signal receivers, j-1 active delay components, an electrical or optical signal driver, and a few more electronic components described in detail later in. The T-ring topology connects each AVAN module with j T-sections, each representing a bit-wide data path from which one is connected to the electrical or optical signal driver, and each of the other j-1 to an electrical or optical signal receiver. Therefore, there are j-1 T-sections bringing bit-wide data into each AVAN module and only one that takes the data out. For every received data block the A-path control selects for every received data block one of the j-1 data paths and connects it with its signal driver sending the data back onto the T-ring, unless the received data is its own transmission returning from its travel around the ring, in which case the A-path control eliminates it. Since only one of the j-1 T-sections bringing data into each module is selected and connected to the signal driver of the T-section of each AVAN module, a continuous active-passive, bit-wide and unidirectional closed-loop signal path is formed over the AVAN backplane, called AVAN ring.

Figure 3:
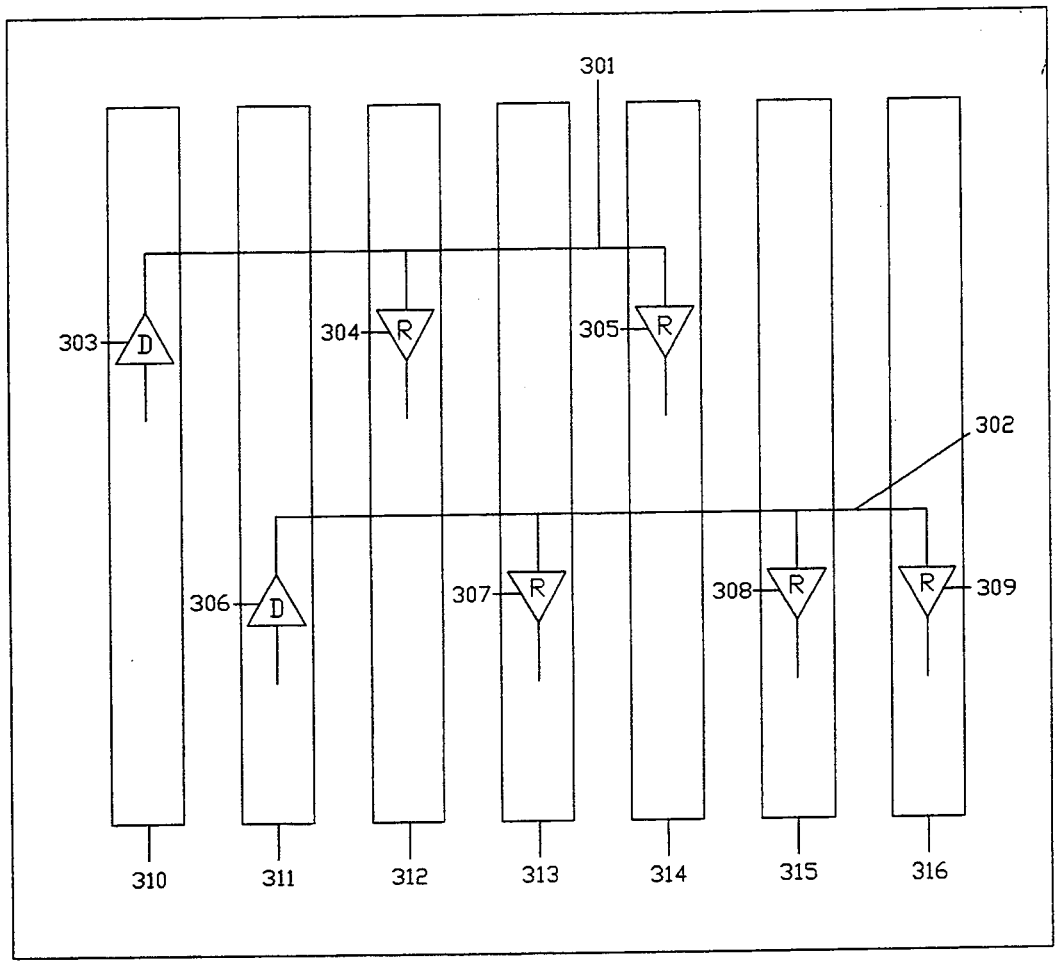
FIG. 3 illustrates two different j value T-sections of an AVAN ring and their corresponding signal driver and receivers.

FIG. 3 illustrates two different j value T-sections 301 and 302 of two different AVAN rings. For the first AVAN ring a signal driver 303 in the AVAN module 310 is connected by a j-3 T-section to two signal receivers 304 and 305 in the AVAN modules 312 and 314, respectively. For the second AVAN ring a signal driver 306 in the AVAN module 311 is connected by a T-section, where (j=4), with three receivers 307, 308 and 309 in the AVAN modules 313, 315 and 316, respectively.

Figure 4:
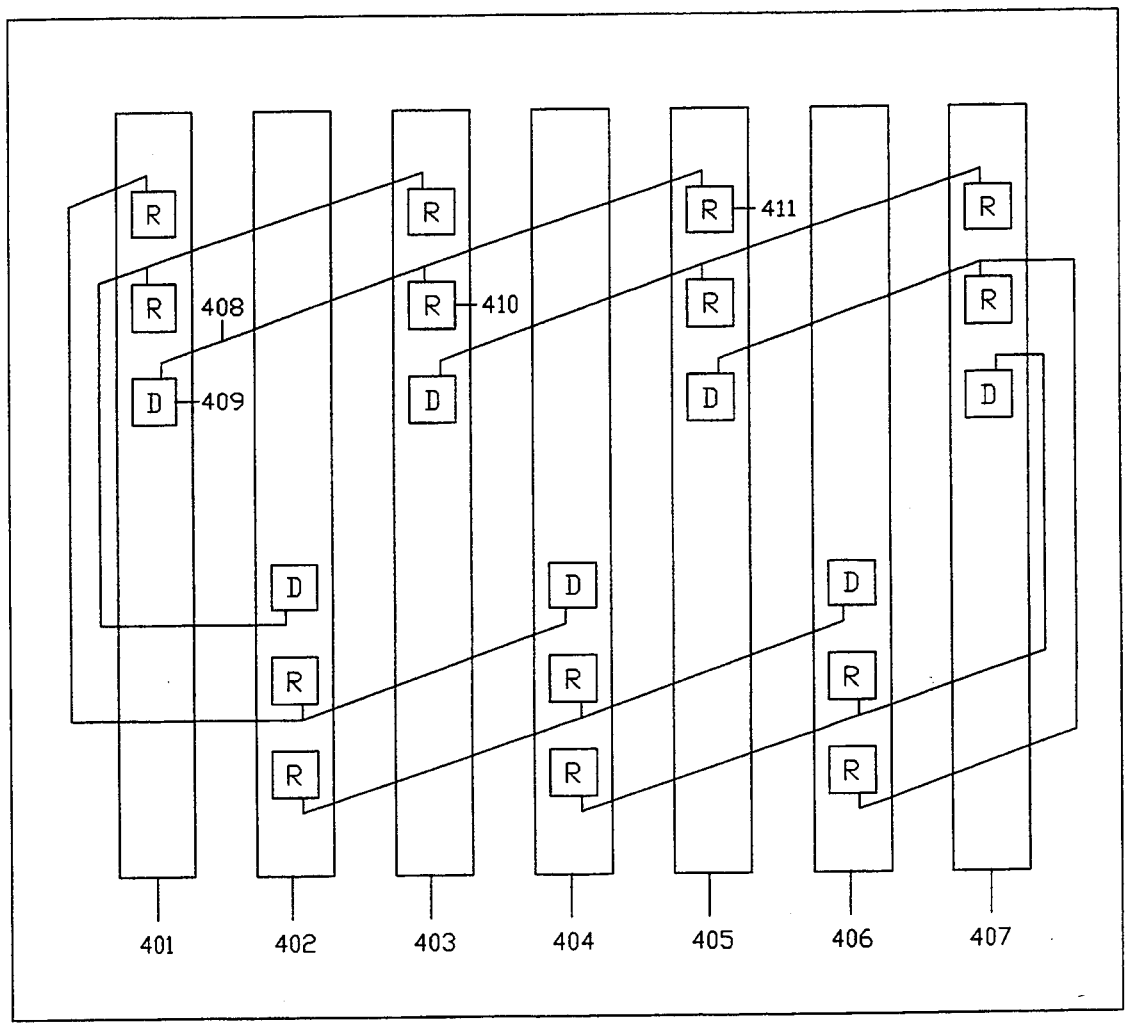
FIG. 4 illustrates the complete topology of an AVAN ring using j=3 T-sections.

FIG. 4 illustrates an AVAN ring connecting seven AVAN modules (M=7) and using three (j=3) T-sections. A T-section starts from a signal driver "D" of an AVAN module and terminates at a signal receiver "R" of two other AVAN modules. The most optimum signal path is achieved by connecting every other AVAN module. At the end of the backplane the T-sections fold back to the other direction and continue connecting the previously left unconnected AVAN modules. This optimized topology restricts the use of long T-sections and therefore maximizes the backplane data rate and the backplane length. In the illustration a T-section 408 connects the signal driver 409 of the AVAN module 401 to the signal receiver 410 of the AVAN module 403 and the signal receiver 411 of the AVAN module 405 after bypassing the AVAN modules 402 and 404. Similarly, six more T-sections form a complete AVAN ring with each connecting the following three AVAN modules; module 403 to modules 405 and 407; module 405 to modules 407 and 406; module 407 to modules 406 and 404; module 406 to modules 404 and 402; module 404 to modules 402 and 401; module 402 to modules 401 and 403.

An AVAN ring T-section contains only one signal driver. It is although permissible more than one signal drivers to be connected to every or some of the T-sections, if and only if more than one AVAN rings share the same T-sections or T-ring. This is permissible under the following two conditions: (1) for every additional signal driver connected to a T-section at one of the other j AVAN modules connected to this T-section a corresponding signal receiver must be added at every of the other j-1 AVAN modules of the other j modules connected by this T-section; and (2) the signal transmitted by any additional signal driver over the same T-section must not interfere with the signals transmitted by the other drivers using this T-section.

Figure 5:
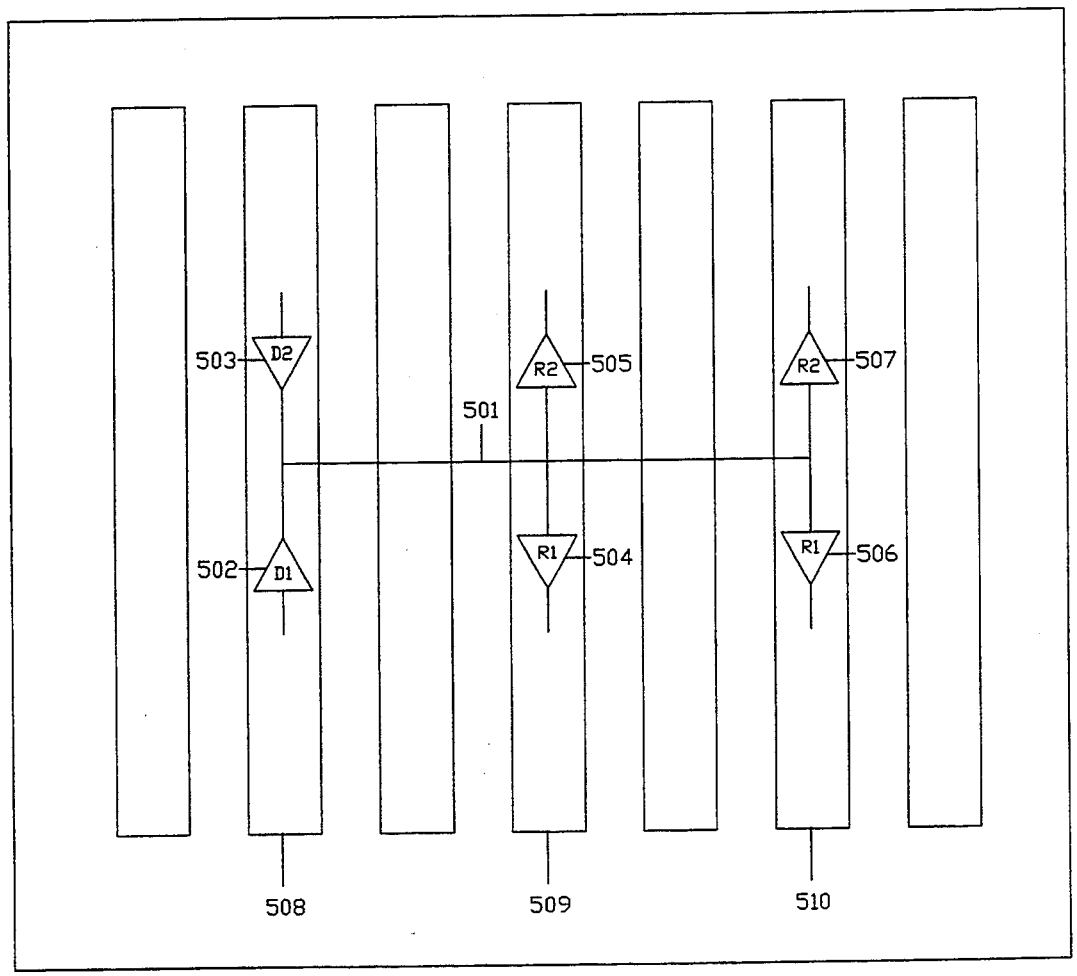
FIG. 5 illustrates a two drive unidirectional data transfer T-section shared by two AVAN rings.

FIG. 5 illustrates a T-section 501, where j=3, shared by two AVAN rings transferring data in the same direction. The first AVAN ring uses a signal driver 502 in AVAN module 508 and signal receivers 504 and 506 in AVAN modules 509 and 510, respectively. The second AVAN ring uses a signal driver 503 in AVAN module 508 and signal receivers 505 and 507 in AVAN modules 509 and 510, respectively.

Figure 6:
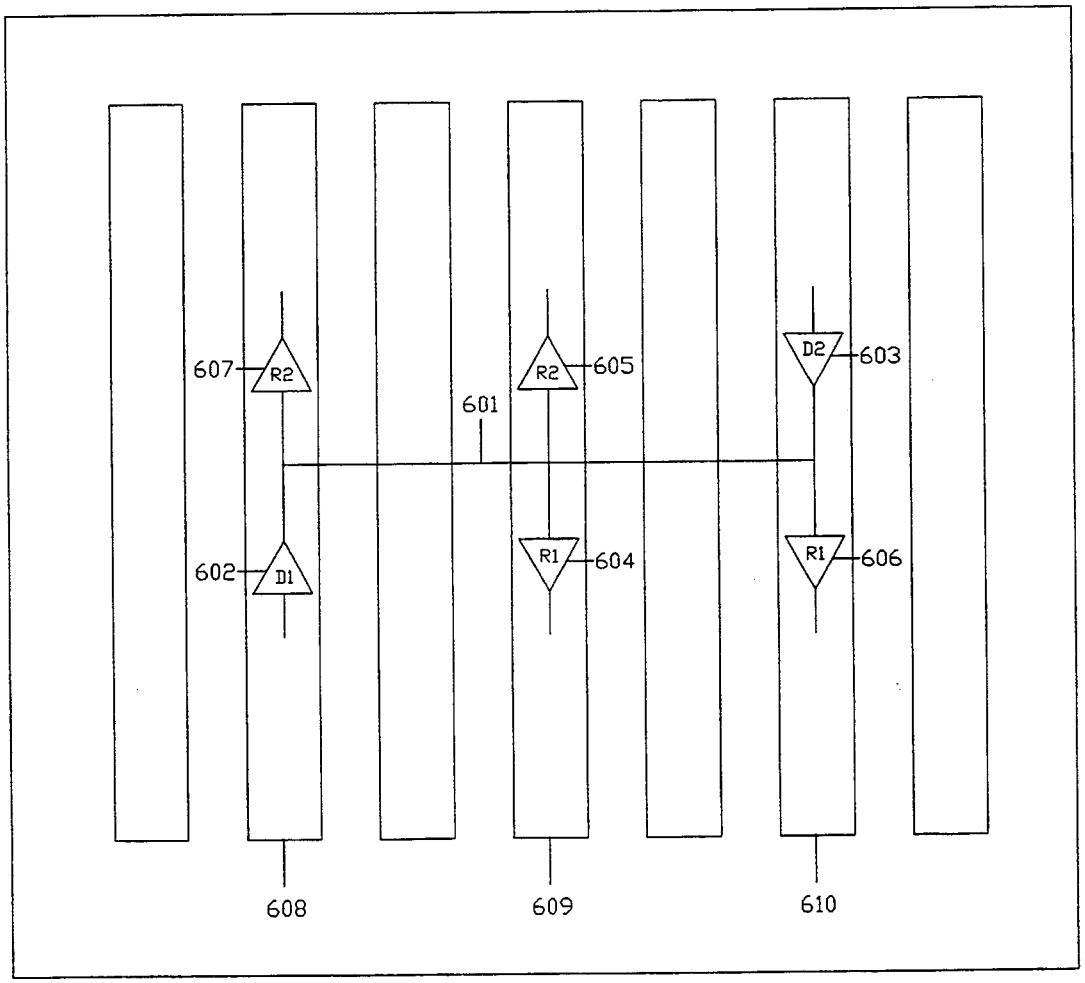
FIG. 6 illustrates a two drive bi-directional data transfer T-section shared by two AVAN rings.

FIG. 6 illustrates a T-section 601, where j=3 shared by two AVAN rings transmitting data in the opposite direction. The first AVAN ring uses a signal driver 602 in AVAN module 608 and signal receivers 604 and 606 in AVAN modules 609 and 610, respectively. The second AVAN ring uses a signal driver 603 in AVAN module 610 and signal receivers 605 and 607 in AVAN modules 609 and 608, respectively.

The received data from each of the j-1 paths and the data transmitted out of an AVAN module may be modulated by some data-clock synchronization scheme, for example Manchester or ANSI 4-bit/5-bit Non Return To Zero Invert (NRZI). The scheme of not modulating the data by a data-clock synchronization method, but transmitting non modulated Non Return to Zero (NRZ) data over the AVAN ring and its transmit clock over an additional parallel T-ring is used in this embodiment. The clock travels over its own AVAN ring. The clock received from each of the j-1 T-sections of the AVAN module is used to store the data of the corresponding path into a FIFO memory, or other data elastic buffer. The local master clock of the AVAN module is then used as the data transmit clock, which is transmitted out over the T-section of its exclusive T-ring simultaneously with the data, which is transmitted over the AVAN ring.

Data delays are introduced into the paths bringing data into the AVAN module from j-1 T-sections. The delays have a value monotonically increased as the T-section bringing the data initiates from an AVAN module connected in the AVAN ring further away from the current AVAN module. These delays are used to compensate for the delay that data suffers as it passes through intermediate AVAN modules, compared to the data arriving in the same AVAN module from T-sections bypassing some or all of the intermediate AVAN modules. A T-section starting from an AVAN module brings the data to the next module in the AVAN ring sequence, where the data is separated in two identical data blocks, from which one continues traveling over the same T-section, while the other enters this AVAN module and exits from it transmitted over the next T-section. Therefore, at the third AVAN module in the AVAN ring sequence, where j=3, the data from the bypassing T-section originating from the Kth-2 module will arrive earlier than the data from the T-section initiated from the Kth-1 AVAN module. Although the data from the previous AVAN module T-section arrives later than the same data arriving from any other T-section, the previous AVAN module T-section is considered the primary data path because it carries not only the data of all other AVAN modules, but also its own originating module's data. No other T-section can carry this data, because all other T-sections bypass this AVAN module. The next important path is the T-section initiated from the AVAN module before the previous one for the same reasons just described. Therefore, a delay is introduced at the j-1 T-section data paths to reverse the priority of data arrival in each AVAN module, since the first of the paths bringing data is selected for reception and retransmission of the data back onto the AVAN ring.

Figure 7:
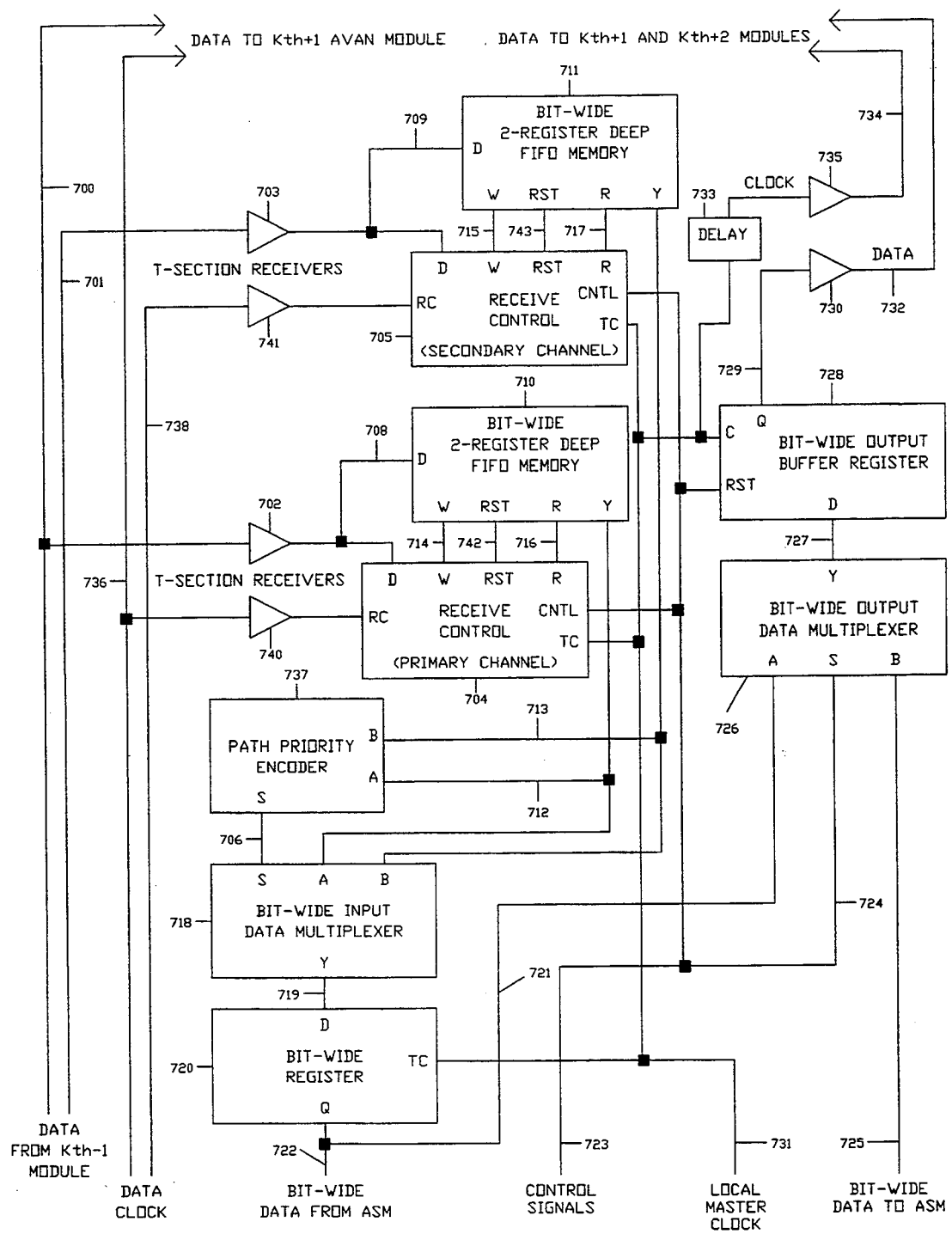
FIG. 7 illustrates the simplified circuit of the A-path of the AVAN module.

FIG. 7 illustrates a simplified schematic of the A-path circuit of an AVAN module connected by an AVAN ring using j=3 T-sections. The data arriving into each AVAN module from the Kth-1 T-section of the AVAN ring is the primary data path, while the data arriving from the Kth-2 T-section is the secondary data path. The data entering an AVAN module follow the following active path before been retransmitted back onto the AVAN ring: from the Kth-1 T-section 700 through signal receiver 702 and Kth-2 T-section 701 through signal receiver 703; if the Transmit Clock signal transmitted over an additional T-ring enters from its Kth-1 T-section 736 through signal receiver 738 and from its Kth-2 T-section 740 through signal receiver 741; two data path Receive Controls 704 and 705 use the received clock 740 and 741 to generate a write signal 714 and 715 to store the bit-wide data of each data path 708 and 709 into a FIFO memory 710 and 711, respectively. The FIFOs play the role of data path delay and the received data to Local Master Clock synchronizer: the two data path Receive Controls 704 and 705 use the Local Master Clock 731 to generate a signal 716 and 717, to read the two FIFO memories 710 and 711, simultaneously. Therefore a synchronization occurs between all the received data and the Local Master Clock. The Receive Controls also generate a reset signal 742 and 743 at the end of a received data block to reset the two FIFOs; a Path Priority Encoder 737 monitors the output 712 and 713 of the two FIFOs 710 and 711 at every clock period to detect and select the one bringing data first ignoring the other for the duration of this data; the output data 712 and 713 from the two FIFOs 710 and 711 are also directed to a bit-wide Input Data Multiplexer 718. The priority encoder 737 forces the multiplexer 718 to select the right path through the control signal 706; the selected by the Input Data Multiplexer 718 data is directed through path 719 to a bit-wide data Input Buffer Register 720 and stored using the Local Master Clock; the data from the Input Buffer Register 720 is directed through path 721 to the Transmit Data Multiplexer 726 for retransmission to the AVAN ring. The same data is also directed through path 722 to the hosted by the AVAN module ASM, if it is required; along with the data 721 from the Input Buffer Register 720, bit-wide data from the hosted ASM 725 enter the Transmit Data Multiplexer 726; a transmit control signal 724, one of several control signals 723 generated under the command of the AVAN backplane protocol selects either the data from the input buffer register 720 for retransmission over the AVAN ring, or ASM data 725 for its first time transmission over the AVAN ring; the selected bit-wide data by the Transmit Data Multiplexer 726 is directed through path 727 and stored in a bit-wide Output Buffer Register 728 using the Local Master Clock 731; the bit-wide data from the Output Buffer Register 728 is directed through path 729 to the AVAN ring signal driver 730. The Local Master Clock 731 is directed to the signal driver 735 for transmission over the Kth T-section of the Clock T-ring. The two signal drivers of data 730 and clock 735 transfer the bit-wide data and clock over their Kth T-sections 732 and 734 to the next in the T-ring sequence Kth+1 and Kth+2 AVAN modules.

Figure 8:
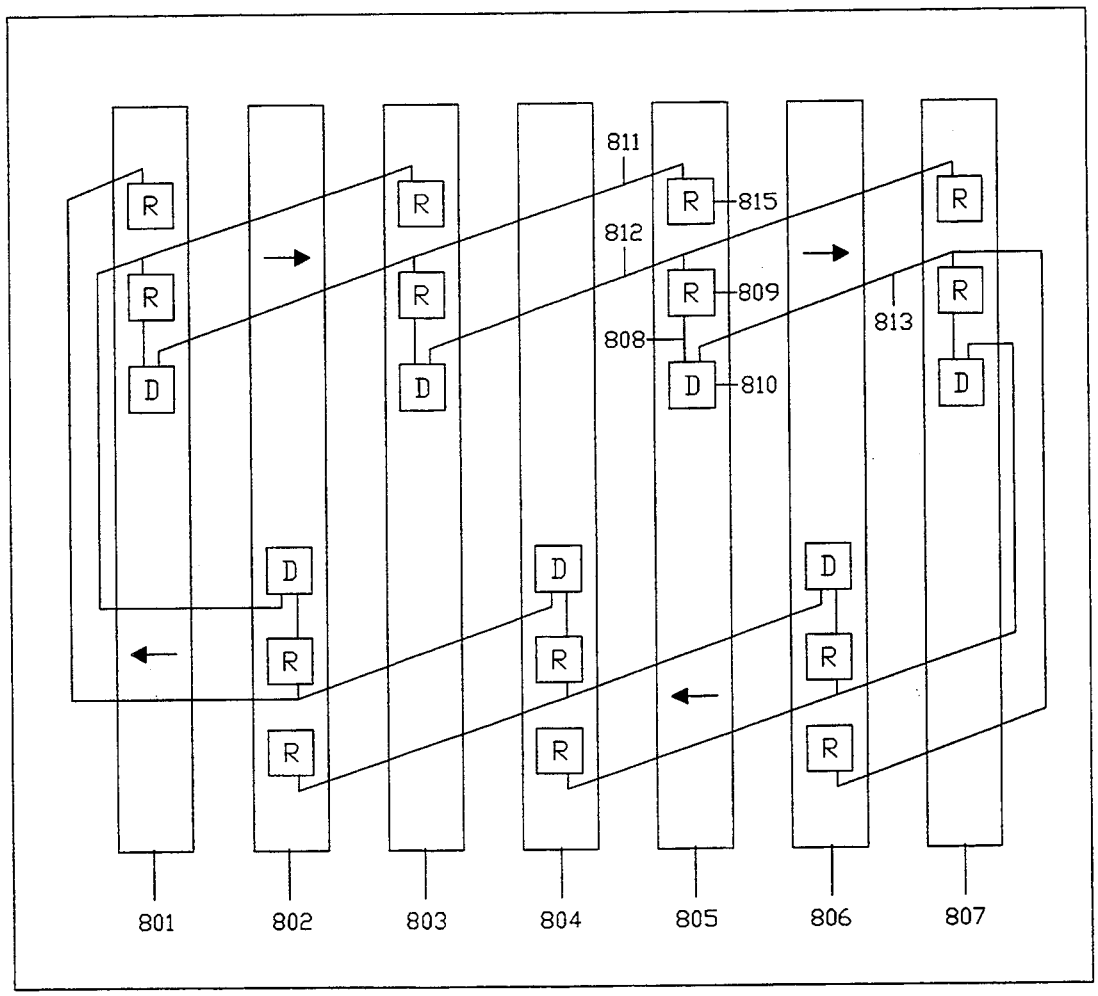
FIG. 8 illustrates an operational AVAN ring using j=3 T-sections.

FIG. 8 illustrates a fully operational AVAN ring connecting seven AVAN modules (M=7) with three (j=3) T-sections and corresponding A-paths. Each AVAN module uses the A-path to close the AVAN ring by connecting the signal receiver with its signal driver. This is the normal connection unless the previous AVAN module fails, in which case the Kth-2 T-section is selected. In the illustrated example the T-section 812 is connected to T-section 813 by an A-path of the AVAN module 805 comprising in its simplest form by a signal receiver 809, an internal to AVAN module active path 808 and a signal driver 810. Since in this example j=3, there are two data paths (j-1 T-sections) of the AVAN ring bringing data in each AVAN module. Therefore two T-sections 811 and 812 bring data in the AVAN module 805. Assuming that the AVAN module 805 represents the general module K (K=1,2,3,...,M) then the T-section 813 connected to its signal driver 810 represents the Kth T-section of the AVAN ring. The T-section connected to the signal receiver 809 of the AVAN module 805 which is initiated from the previous in the AVAN module 803 is the Kth-1 T-section 812 of the AVAN ring. The T-section 811 connected to the signal receiver 815 of the AVAN module 805 and initiated from the AVAN module 801, which in ring sequence is the module before the previous one 802, is the Kth-2 T-section. All the T-sections of a T-ring connected the same way within the seven AVAN modules form a normally operating AVAN ring.

Figure 9:
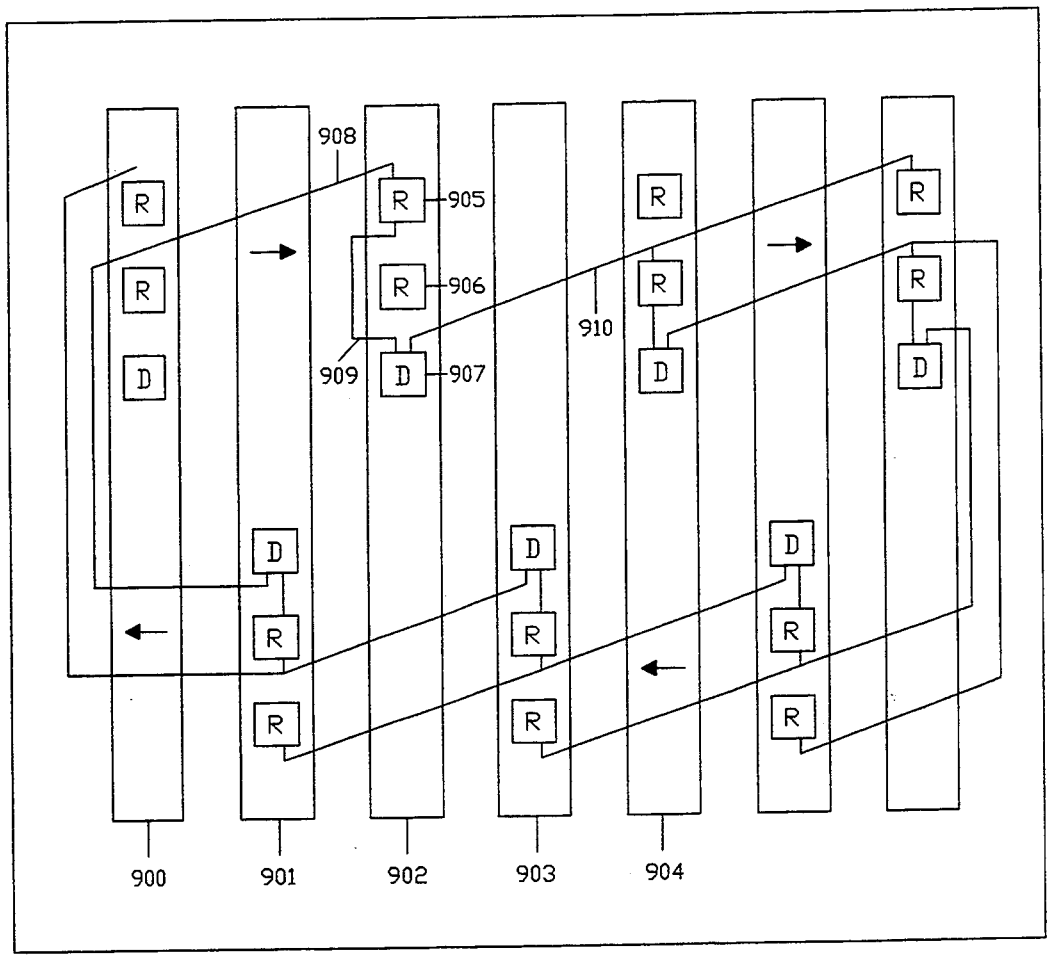
FIG. 9 illustrates an example of an operational AVAN ring under a single failure.

FIG. 9 illustrates an AVAN ring with the AVAN module 900 turned OFF, or failed. Under this single fault condition the AVAN ring is still operational. In this case, no data is received from the signal receiver 906 of the AVAN module 902, but instead the same data arrives from signal receiver 905 connected to Kth-2 T-section 908, and therefore the Kth-2 T-section is selected for the reception and recirculation of the data over the AVAN ring. Therefore, the AVAN ring continues to operate avoiding loss of the transmitted data and time from the occurred failure.

Figure 10:
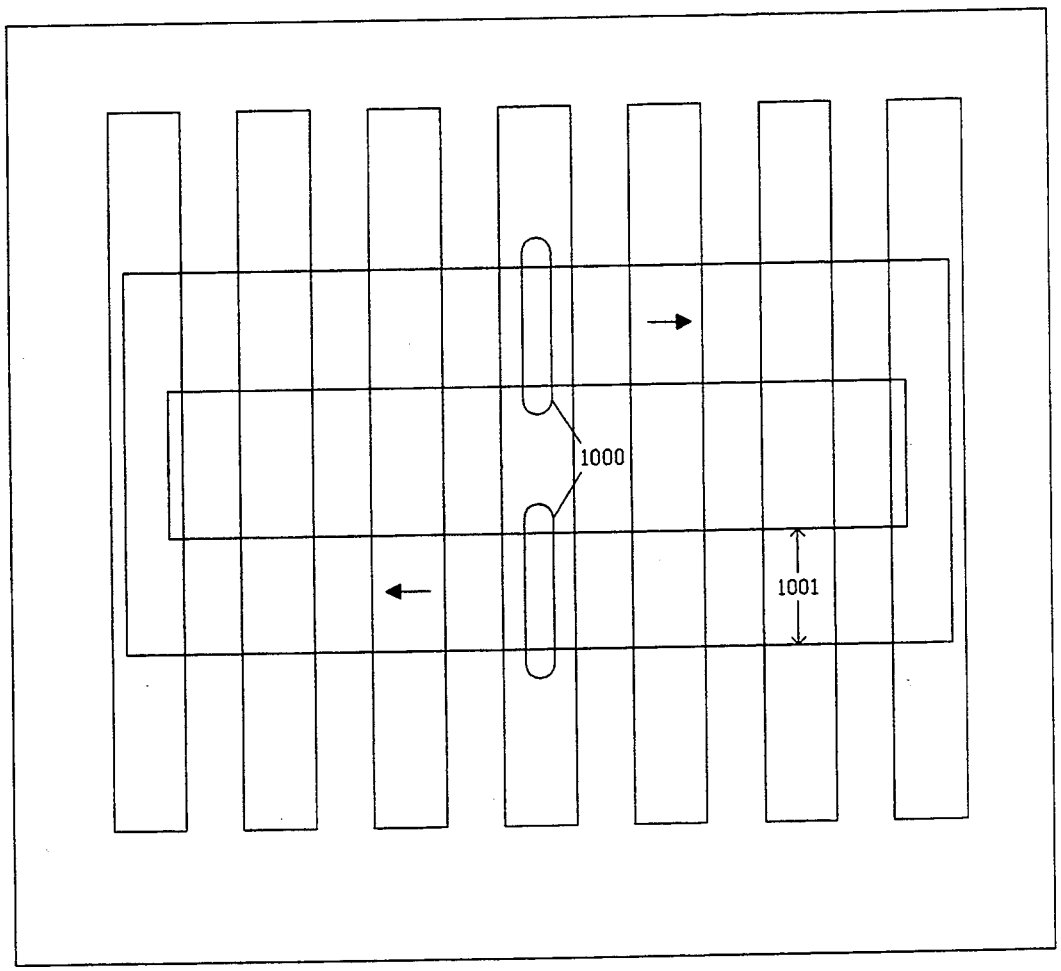
FIG. 10 illustrates an AVAN ring bus.

An AVAN ring bus n-bit wide (n=1,2,3,...) comprises n parallel and same direction AVAN rings with or without a clock T-ring. FIG. 10 shows the AVAN ring bus 1000 with each AVAN ring represented by a closed loop path 1001. Each AVAN module connected by the AVAN ring bus supplies n A-paths each connected with j T-sections. If the clock is transferred over a parallel T-ring, only one such T-ring is required for each AVAN ring bus.

AVAN backplanes with multiple AVAN ring buses of equal or unequal number of AVAN rings, of same or opposite data transfer direction are also supported as alternative embodiments of by this invention. In this case each AVAN ring bus of the backplane will be connected and operate as described above. This embodiment also permits some of the AVAN ring buses to be connected only to a subset of the AVAN modules of the AVAN backplane.

Figure 11:
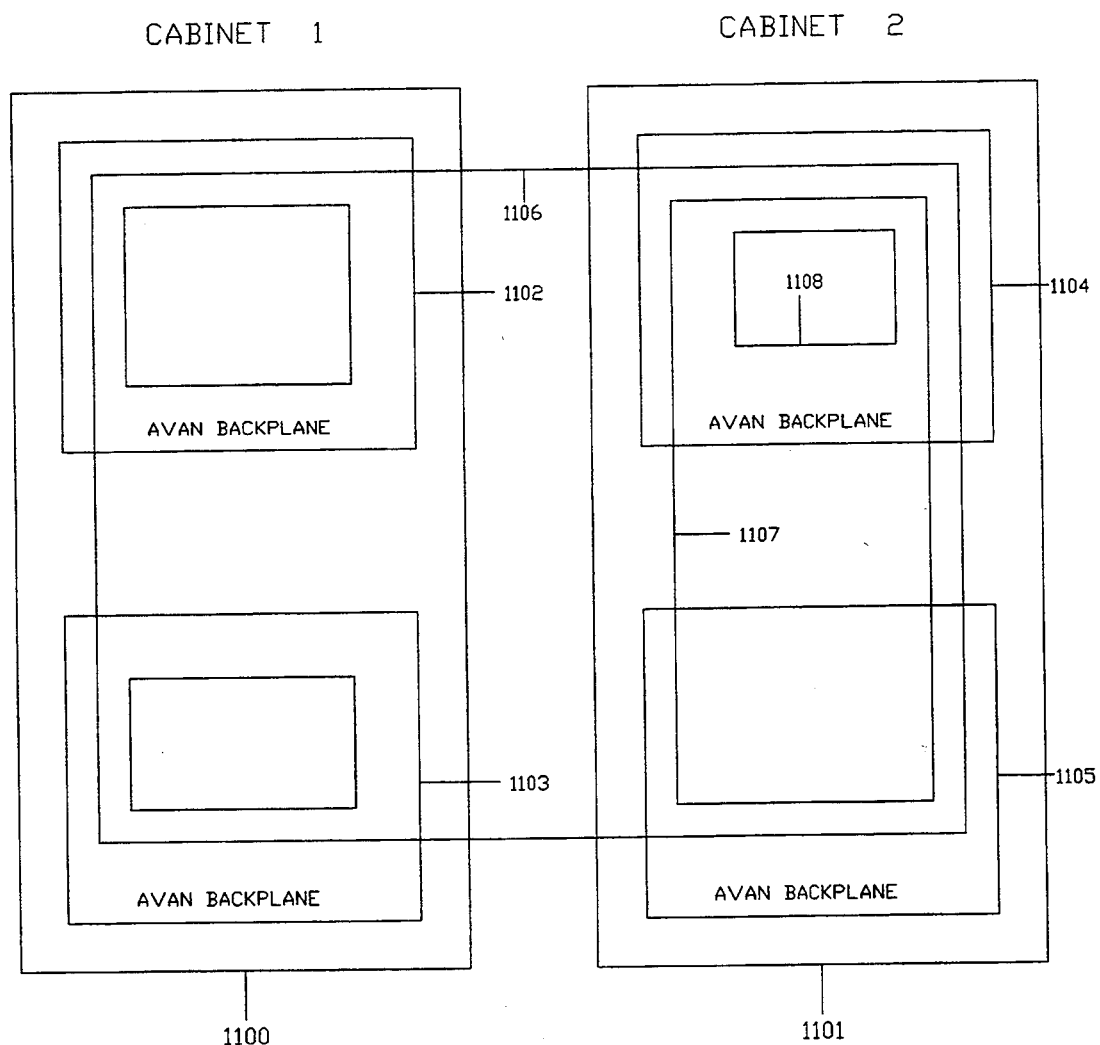
FIG. 11 illustrates AVAN ring buses interconnecting AVAN computer backplanes residing in same or separate cabinets.

FIG. 11 illustrates AVAN ring buses connecting AVAN modules residing in different AVAN backplanes in same and different cabinets. In this example, two AVAN backplanes 1102, 1103 reside in same cabinet 1100, and two more 1104 and 1105 in cabinet 1101. All the AVAN modules of the four AVAN backplanes are connected by an AVAN ring bus 1106. Additionally, all AVAN modules of the two AVAN backplanes 1104 and 1105 are connected by a different AVAN ring bus 1107 and a subset of the AVAN modules of the AVAN backplane are connected by a third AVAN ring bus 1108. In the AVAN backplane 1104 two AVAN rings 1106 and 1108 transfer data in the same direction, while the AVAN ring 1107 transfers data in opposite direction.

An AVAN backplane can significantly simplify any computer backplane requirements especially those large systems with high speed and parallel processing. Generally the AVAN backplane removes the deficiencies of the conventional backplanes by drastically reducing the number of interconnecting data paths, reducing the Application System communication overhead, and improving their data transfer timing and data throughput. Additionally, the AVAN backplane permits the accommodation of much larger number of ASMs with higher data transfer rates from those of the conventional backplanes.

By now it should be clear that the AVAN backplane provides a backplane which will to reduce the complexity and the number of interconnecting paths of the multi-module and multi-pin modern computer backplanes, as well as of the backplanes of other complex computerized systems. The AVAN backplane reduces the Application System data transfer timing and increases its data throughput. Additionally, the backplane provides a single fault tolerance data transfer over the computer backplane without involvement of the Application System. There is no restriction in the number of Application System Modules hosted by the computer backplane while at the same time the Application System maintains an extremely low bit error rate (BER) and a very high data transfer rate. The AVAN backplane also simplifies the data transfer process among the Application System Modules and reduces their communication overhead by having the computer backplane undertaking this responsibility for every Application System it hosts. The AVAN backplane achieves these goals during communication among Application System Modules which reside in different computer backplanes of either the same or separate cabinets.

What is claimed is:

1. A signal path topology, comprising:
   a plurality of digital modules;
   a plurality of data transmission sections, not physically connected to each other, wherein each data transmission section initiates from a predetermined one of said plurality of digital modules and passively connects to a predetermined number (j-1) of other of said plurality of digital modules, and wherein a selected number of said plurality of data transmission sections fold back to continued connecting previously unconnected digital modules, in a continuous loop process, until all of said plurality of digital modules each has been connected with at least j number of data transmission sections, wherein said j number is said predetermined number plus one.

2. A computer backplane signal path topology, comprising:
   a plurality of computer backplane modules;
   a plurality of T-sections, not physically connected to each other, all together forming a ring-like topology, wherein each T-section initiates from a predetermined one of said plurality of computer backplane modules and passively connects to a predetermined number (j-1) of other of said plurality of computer backplane modules, wherein at the end of the backplane structure said T-section folds back to continue connecting previously unconnected computer backplane modules, in a continuous loop process, until all computer backplane module each has been connected with at least j number of T-sections, wherein said j number is said predetermined number plus one.

3. The computer backplane of claim 2, further comprising:
   a plurality of data input paths comprising a plurality of signal receivers, each signal receiver connected to a corresponding one of said T-sections which is passively connected to a predetermined computer backplane module;
   a plurality of data delay components, each connected at the output of one of said plurality of signal receivers, wherein said data delay components each provides a different delay value;
   a path priority encoder which monitors the output of said data delay components and generates a control signal therefrom;
   a first data multiplexor responsive to said control signal for selecting one of said data input paths which receive data into said predetermined computer backplane module;
   a data input buffer register, under the control of a local master clock, which stores data from the output of the first data multiplexer;
   a second data multiplexer for selecting between data output from said data input buffer register and data output from a hosted Application System Module associated with said predetermined computer backplane module;
   a data output buffer register for storing the output of said second data multiplexer responsive to said local master clock; and
   a data output path comprising a signal driver, wherein the input of said signal driver is connected to the output of said data output buffer register and the output of said signal driver is connected to said T-section initiating from said predetermined computer backplane module.

4. A computer backplane data path connecting a plurality (M) of computer backplane modules in a backplane structure, comprising:
   a T-ring comprising a plurality (j<=M) of T-sections, not physically connected to each other, all together forming a ring-like topology, wherein one T-section initiates from each of the plurality of computer backplane modules and passively connects a desired number (j-1) of other computer backplane modules, and at the end of the backplane structure said T-section folds back to continue connecting previously unconnected computer backplane modules of said plurality of computer backplane modules, in a continuous loop process, until all computer backplane modules each has been connected with at least j number of T-sections, wherein said j number is said desired number plus one;

a plurality of A-paths, for each the plurality of computer backplane modules, each A-path connecting T-sections of said T-ring to form an active-passive, unidirectional data ring.

5. The computer backplane of claim 4, further comprising:

a clock T-ring which carries the transmit clock information in and out, to and from each of the plurality of computer backplane modules, said clock T-ring comprising a plurality of sets of electronic components, one set for each of the plurality of computer backplane modules, and wherein each set of electronic components comprise a plurality of signal receivers and one signal driver.

6. The computer backplane of claim 4, further comprising:

a printed circuit board where an A-path is installed;

a first connector where an Application System Module is inserted into the computer backplane; and a second connector for the computer backplane module to be inserted and locked in the backplane structure.

7. The computer backplane of claim 4, wherein said T-ring and A-paths comprise a plurality of signal paths for carrying simultaneous parallel data.

8. The computer backplane of claim 4, wherein said computer backplane comprises a computer motherboard and wherein said computer backplane modules are inserted and locked into said computer motherboard.

9. The computer backplane of claim 4, wherein said computer backplane comprises a plurality of computer cabinets, said cabinets comprising a plurality of computer motherboards and backplane structures for insertion of said backplane modules.

* * * * *